United States Patent

Uchiyama et al.

[11] 4,016,575
[45] Apr. 5, 1977

[54] EXPOSURE CONTROL SYSTEM FOR FLASH PHOTOGRAPHY

[75] Inventors: Takashi Uchiyama, Yokohama; Yukio Mashimo, Tokyo; Zenzo Nakamura, Urawa, all of Japan

[73] Assignee: Canon Kabushiki Kaisha, Tokyo, Japan

[22] Filed: Mar. 31, 1975

[21] Appl. No.: 563,463

[30] Foreign Application Priority Data

Apr. 3, 1974 Japan ............... 49-37645
July 15, 1974 Japan ............... 49-80841

[52] U.S. Cl. ............... 354/33; 354/60 F; 354/139; 354/149
[51] Int. Cl.² ............... G03B 7/16; G03B 15/03
[58] Field of Search ............ 354/27, 32, 33, 60 F, 354/126, 129, 139, 149

[56] References Cited

UNITED STATES PATENTS

| | | | |
|---|---|---|---|
| 3,667,357 | 6/1972 | Matsuda | 354/33 |
| 3,675,547 | 7/1972 | Uchiyama et al. | 354/33 |
| 3,699,858 | 10/1972 | Ogiso et al. | 354/33 |
| 3,805,278 | 4/1974 | Matsuzaki et al. | 354/33 |
| 3,886,568 | 5/1975 | Yazaki et al. | 354/139 |
| 3,893,143 | 7/1975 | Taguchi et al. | 354/259 |
| 3,971,049 | 7/1976 | Ohmori et al. | 354/60 F |

Primary Examiner—Russell E. Adams, Jr.
Attorney, Agent, or Firm—Toren, McGeady and Stanger

[57] ABSTRACT

A flash photographic exposure control system for a camera having an electrically timed shutter is provided with an additional electronic or mechanical timing device in combination with an electronic changeover switch responsive to attainment of the threshold level of the flash unit associated therewith. This is done to switch the camera from an automatic daylight exposure range to an automatic flash exposure range in which a particular timed interval suited for flash photography is made by the timing device which is brought into cooperation with the shutter operating means when the changeover switch is actuated, while the intrinsic timing device for the shutter being cut off from the control means for the shutter.

32 Claims, 17 Drawing Figures

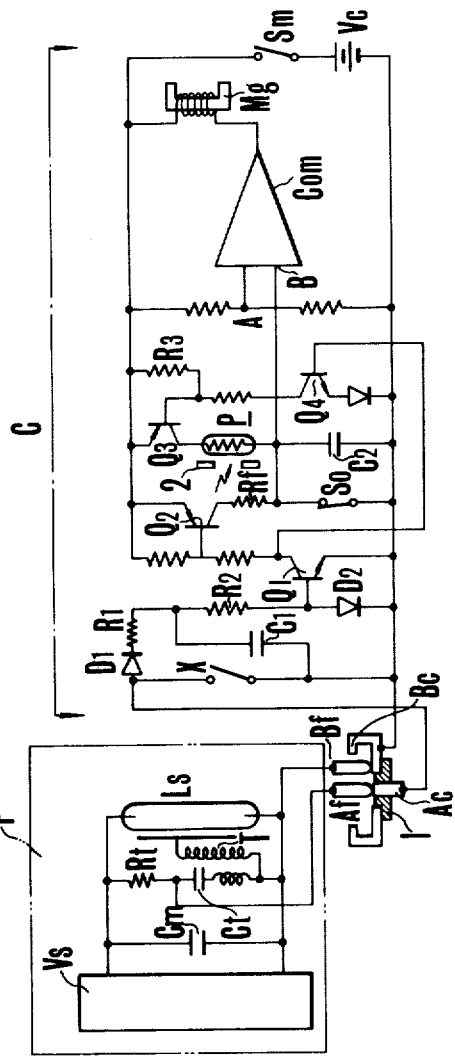
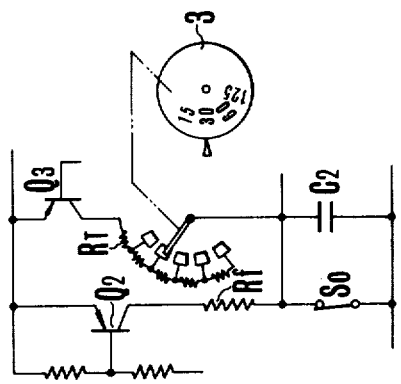
FIG.1a
FIG.1b

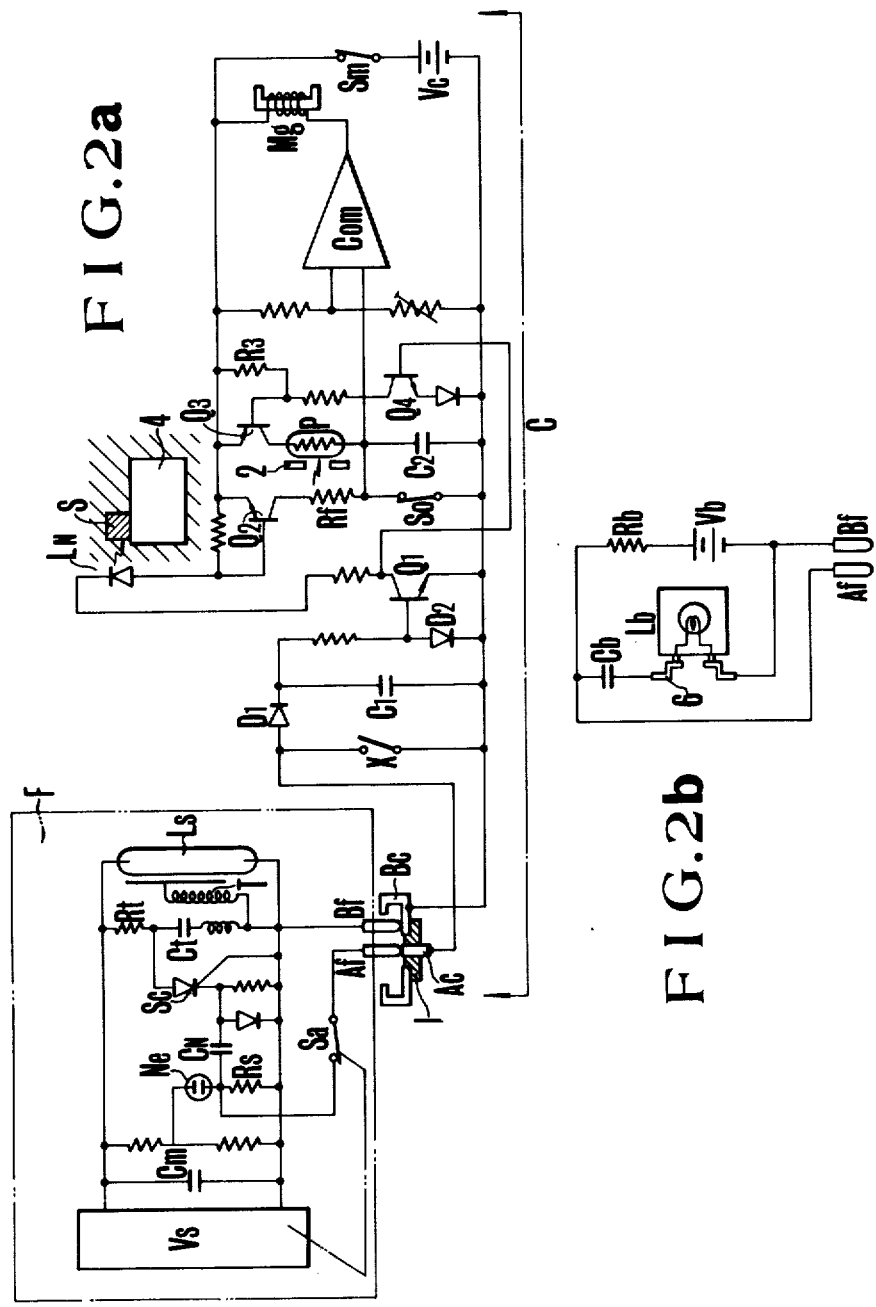

F I G.14
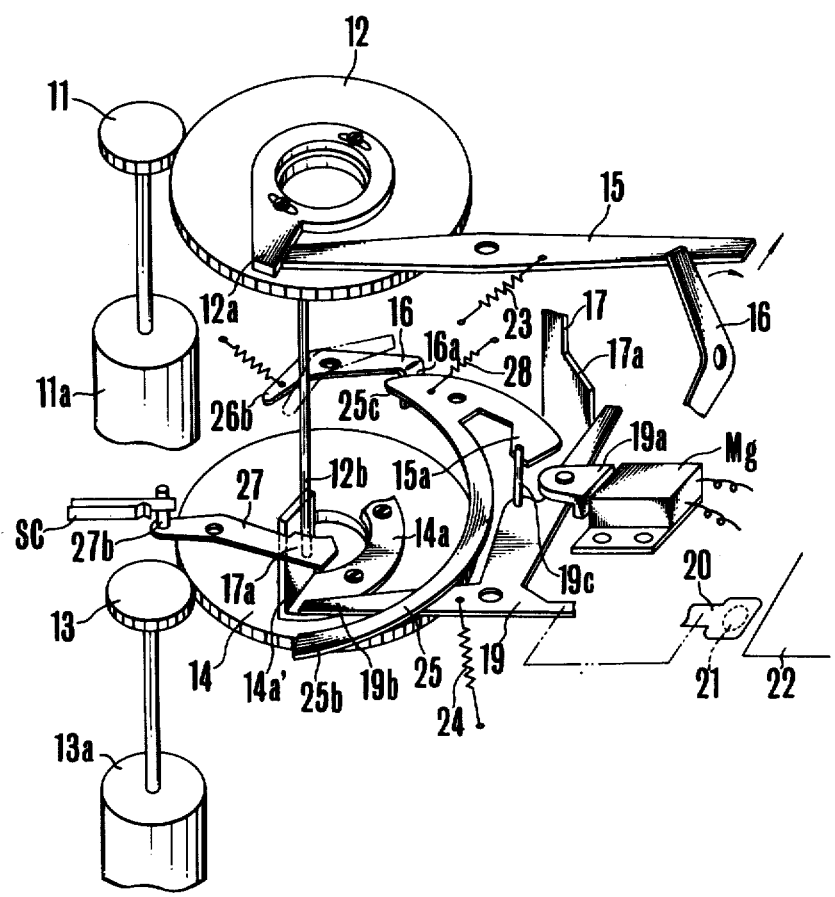

EXPOSURE CONTROL SYSTEM FOR FLASH PHOTOGRAPHY

BACKGROUND OF THE INVENTION

This invention relates to exposure control systems for photographic cameras, and, more particularly, to a flash photographic exposure control system for a camera having an electrically timed shutter provided with an electronic or mechanical switch by which the camera is switchable from an automatic daylight exposure range to an automatic flash exposure range in response to attainment of a threshold voltage level of a stroboscopic system associated therewith.

For taking photographs with illumination from an activated flash unit, it is necessary to adjust the camera shutter to a predetermined setting such as providing a shutter speed of 1/30 second, or 1/60 second, because of a compromise between a large inertia of the shutter and the output characteristics of the flash unit. Conventionally, this adjustment has been made intentionally by hand, when the camera is used in the flash mode. Therefore, the camera equipped with an automatic daylight exposure range and an automatic flash exposure range has the latent possibilities of improper adjustments of the shutter due to the negligence and erroneous judgment of the camera operator. In such cases, no correct exposure can be made. To resolve this problem, a proposal has been made in which the adjustment of the camera to the particular setting for flash photography is automatically effected in response to attachment of a flash unit to the camera. This arrangement is, however, incapable of responding to the threshold voltage level of the flash unit, permitting the flash tube thereof to be discharged with supply of electrical energy from the main store capacitor even when the main capacitor is charged to a voltage lower than the critical anode-to-cathode voltage of the flash tube, thus resulting in the production of a corresponding improper flash lighting condition.

SUMMARY OF THE INVENTION

The present invention has for the general object to overcome the above mentioned conventional drawbacks, and to provide an exposure control system for a camera provided with an electronic or mechanical changeover switch by which the camera is switchable from an automatic daylight exposure range to an automatic flash exposure range in response to attainment of a threshold level of the flash unit associated with the camera.

A feature of the invention consists in that an exposure control system for a camera having an electrically timed shutter or so-called electronic shutter is provided with an additional electronic or mechanical timing device by which a timed interval suited for flash photography is made independently of the control means for the shutter only when the threshold level of the flash unit is attained.

According to one embodiment of the invention, a flash photographic exposure control system for a camera having an electronic shutter is provided with an electronic circuit-transfer switch responsive to attainment of the threshold level of the flash unit to switch the camera to the automatic flash exposure range in which a particular timed interval is made by an electronic timing device which is brought into cooperation with the shutter operating means, when the circuit-transfer switch is actuated, with the intrinsic timing device for the daylight exposure range being cut off from the control means for the shutter.

According to an alternate embodiment of the invention, a flash photographic exposure control system for a camera having an electronic shutter is provided with a mechanical timing device which is brought into cooperation with the shutter operating means when the camera is switched to the automatic flash exposure range by means of either an electronic or a mechanical changeover switch which is automatically operated in response either to attachment of the flash unit to the camera, or to attainment of the threshold level of the flash unit associated therewith, with the intrinsic timing device for the daylight exposure range being cut off from the control means for the shutter.

Other objects, features and advantages of the present invention with respect to the construction, combination and arrangement of the electronic and mechanical timing devices for the flash exposure range, and the electronic and mechanical changeover switches controlling the transfer operation between the automatic daylight and flash exposure ranges will become apparent from the following detailed description taken in conjunction with the accompanying drawings.

BRIEF DESCRIPTION OF THE DRAWINGS

FIG. 1a is a circuit diagram of a first example of one embodiment of a flash photographic exposure control system according to the present invention, as applied to a camera of the type having an electrically timed shutter and equipped with a diaphragm preselection automatic exposure range, and of a storoboscopic type flash unit associated therewith.

FIG. 1b is a fragmentary circuit diagram of a second example of the embodiment of FIG. 1a as applied to a camera equipped with a shutter preselection automatic exposure range.

FIG. 2a is a circuit diagram of a third example of the embodiment of the invention with modifications for flash exposure indicators.

FIG. 2b is a circuit diagram of a bulb type flash unit usable in the embodiment of the invention.

FIG. 3b is a circuit diagram of a fourth example of the embodiment of the invention as applied to a camera having a focal plane shutter of the type shown in FIG. 3a.

FIG. 6 is replaced by an electronic cut-off switch.

FIG. 14 is a similar view illustrating a modification of the device of FIG. 13.

DETAILED DESCRIPTION OF THE PREFERRED EMBODIMENTS

Figure 3A:
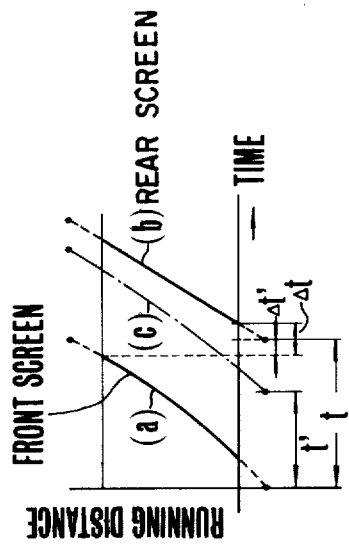
FIG. 3a is a graph illustrating the operating principles of a two-curtain type focal plane shutter.

Referring now to FIG. 1a, there is shown an example of one embodiment of a flash photographic exposure control system for a camera of the type having an electronic shutter provided with an electronic circuit-transfer switch network by which the camera is switchable from a diaphragm preselection automatic daylight exposure range to an automatic flash exposure range in automatic response to attainment of the trigger voltage of a trigger capacitor for a gaseous discharge flash-tube to a threshold voltage level in a stroboscopic system of a flash unit F. The stroboscopic system F comprises a high voltage electric power source $Vs$, a main capacitor $Cm$ connected across power source $Vs$ for storing a predetermined amount of electrical energy which is discharged through a discharge flash-tube $Ls$ when it is triggered by a trigger coil T, and a series-connected resistor $Rt$ and trigger capacitor $Ct$, the series circuit $Ct$, $Rt$ being connected across capacitor $Cm$, so that trigger capacitor $Ct$ is charged through resistor $Rt$ to a voltage proportional to the voltage of charge stored on main capacitor $Cm$. The flash unit employing the stroboscopic system F has a pair of terminals $Af$ and $Bf$ connected to the junction of resistor $Rt$ and capacitor $Ct$, and through a coil to the opposite pole of capacitor $Ct$ respectively, and arranged on the housing of flash unit F upon attachment to the camera at the accessory shoe thereof to be brought into contact with camera side terminals $Ac$ and $Bc$ electrically insulated from each other by an insulator 1.

The flash photographic exposure control system C comprises a detector circuit responsive to the voltage of trigger capacitor $Ct$ of flash unit F, a first timing circuit which is rendered operative when the camera is set in the automatic daylight exposure range, a second timing circuit which is rendered operative when the camera is set in the flash exposure range, a comparator Com selectively responsive to the first and second timing circuits for energizing and deenergizing the solenoid of an electromagnet $Mg$, and an electronic circuit-transfer switch network responsive to the detector circuit for selectively connecting the timing circuits to the comparator Com, each of which will be successively described below.

The detector circuit can be traced from terminal $Ac$ through a first diode $D_1$, a first resistor $R_1$, a second resistor $R_2$, and a second diode $D_2$ to terminal $Bc$, and includes a transistor $Q_1$ having a base electrode connected to the junction of resistor $R_2$ and diode $D_2$, a collector electrode connected through two series-connected load resistors to the positive bus of the entire circuit, and having an emitter electrode connected to the negative bus. The first resistor $R_1$ serves to prevent a rapid discharge of the voltage of trigger capacitor $Ct$ from occurring through the detector circuit despite of the fact that a synchro-switch X, which is connected as short-circuiting the trigger capacitor $Ct$ is open, thus the discharge resulting in occurrence of a discharge through flash-tube $Ls$. In order to prevent the transferring of transistor $Q_1$ to the non-conducting state during the time when synchro-switch X is closed, there is provided a capacitor $C_1$ connected across synchro-switch X through diode $D_1$ and resistor $R_1$. The first diode $D_1$ serves to prevent the discharge of the voltage of capacitor $C_1$ through synchro-switch X. The second resistor $R_2$ has a resistance value large enough in relation to the resistance value of resistor $Rt$ of flash unit F to store a sufficient amount of charge on trigger capacitor $Ct$. The second diode $D_2$ serves to apply a constant voltage to the base of transistor $Q_2$ regardless of variation of the voltage across terminals $Ac$ and $Ab$, $Bc$ with variation in the different type flash unit employed. In other words, the commercially available flash units are of various types and accordingly provide a wide range of voltages which are to be applied across the terminals $Ac$ and $Bc$. When the voltage is too high, transistor $Q_1$ will be damaged as it is applied between the base and emitter thereof.

The first timing circuit comprises a photosensitive element P arranged to receive the light coming from an object being photographed, and a common timing capacitor $C_2$ connected in series to element P.

The second timing circuit comprises a variable resistor $Rf$ of which the resistance value is adjusted so as to provide a timed interval for flash photography, and the common capacitor $C_2$ connected in series to resistor $Rf$.

The comparator Com has two input terminals, one of which is connected to a voltage divider for providing a reference voltage, the other of which is connected to both timing circuits at the junctions of element P and, resistor $Rf$ and capacitor $C_2$, and it has an output terminal connected to the solenoid of an electromagnet $Mg$.

The electronic circuit-transfer switch network comprises a first transistor $Q_2$ having a base electrode connected to the junction of the two load resistors of transistor $Q_1$ having an emitter electrode connected to the positive bus and having a collector electrode connected to resistor $Rf$, a second transistor $Q_3$ having a collector electrode connected to photosensitive element P, having an emitter electrode connected to the positive bus, and a base electrode connected to the junction of two collector load resistors $R_3$ of a third transistor $Q_4$ having an emitter electrode connected through a diode to the negative bus and having a base electrode connected to the collector of transistor $Q_1$.

The flash exposure control system C further includes an electric power source or battery $Vc$ having a positive terminal connected through a main switch $Sm$ to the positive bus and having a negative terminal connected directly to the negative bus and to the terminal Bc, and a start switch So connected across capacitor $C_2$ and arranged in the camera housing to be opened in response to an actuation of the shutter release member.

When the main capacitor Cm of the flash unit F is charged from voltage source Vs to a critical voltage for flash-tube Ls, the trigger capacitor Ct is charged to a corresponding voltage which is applied to the detector circuit, thereby the transistor $Q_1$ is rendered conducting. When transistor $Q_1$ is rendered conducting, the first transistor $Q_2$ of the electronic switch network is rendered conducting to connect the second timing resistor Rf to comparator Com, while the second and third transistors $Q_3$ and $Q_4$ are rendered non-conducting to disconnect the first timing resistor or photosensitive element P from comparator Com.

When the shutter button is depressed, the start switch $S_2$ is opened in synchronism with initiation of actuation of the shutter, and simultaneously the main switch Sm is closed to connect the battery Vc to the positive bus. When the shutter is moved to the fully opened position, the synchro-switch X is closed to actuate the trigger circuit (Ct, T) of the flash unit F, thereby the flash-tube Ls is discharged by the supply of electrical energy from the main capacitor Cm. As the timing capacitor $C_2$ is charged from battery Vc through transistor $Q_2$ and resistor Rf to a voltage which is applied to the terminal B of comparator Com, the solenoid of electromagnet Mg is operated at the time when the voltage appearing at the input terminal B of comparator has reached a threshold voltage level set therein at input terminal A, thereby duration of the timed interval depending upon the resistance value of resistor Rf is terminated.

When the flash unit F is not ready for flashing operation yet, namely the charging of the main capacitor Cm is not completed, or when the flash unit F is detached from the camera, transistor $Q_1$ is cut off to make transistor $Q_2$ non-conducting, thereby transistor Rf is disconnected from the exposure control circuit. On the other hand, the cutting off of transistor $Q_1$ causes conduction of transistors $Q_3$ and $Q_4$ to connect photosensitive element P to the control circuit. By adjusting a diaphragm means 2 positioned in front of element P in accordance with the film sensitivity and the preselected diaphragm value, a timed interval for daylight photography depending upon the level of brightness of an object being photographed is produced in a manner similar to that as in the usual electronic shutter camera.

FIG. 1b shows a second example of the embodiment of the invention, wherein a shutter dial 3 is operatively connected to a resistor selection switch Rt of which the selected resistance constitutes the first timing circuit together with the common capacitor $C_2$. With this flash exposure control system, it is possible to switch the camera from the daylight exposure range to the flash exposure range in response to the signal from the flash unit F, thereby the timed interval depending upon the resistance value of variable resistor Rf is made independently of the position of the resistor selection switch RT. It is to be noted that the construction of the terminals Ac and Bc is adapted for association with a wide variety of flash units.

FIG. 2a shows a third example of the embodiment of the invention which is different from the first example in the provision of various safety means and indicators, wherein like numerals are employed to denote the same parts as those of FIG. 1a.

The stroboscopic system F includes a neon tube Ne, a resistor Rs, a capacitor CN, a SCR Sc, and a switch Sa cooperating with a main switch not shown incorporated in the high voltage power source Vs, the arrangement of these parts being such that when the charging of main capacitor Cm has been completed, the neon tube Ne is lighted causing a voltage to be developed across resistor Rs, which is connected between terminals Af and Bf through switch Sa, and further causing capacitor CN is to be charged to a voltage which upon closure of synchro-switch X is rapidly discharged to render SCR Sc conducting, thereby the flash-tube Ls is triggered.

The flash exposure control system C is provided with an indicator 5 arranged near the field of view of the camera finder 4 to be illuminated with a light-emitting element LN, for example, LED, connected between the two load resistors of transistor $Q_1$. The indicator 5 with element LN serves to indicate whether the flash unit F is ready for flashing operation and whether the exposure control system is switched from the daylight exposure range to the flash exposure range, or the vice versa.

When the shutter release member is operated to initiate a flash exposure interval and to close synchro-switch X, capacitor CN which is charged after the neon tube Ne has been lighted is rapidly discharged to render Sc conducting, and trigger capacitor Ct is rapidly discharged to trigger flash-tube Ls. In the exposure interval after the initiation of actuation of the shutter release member, the magnet Mg is operated to close the shutter, thereby duration of the exposure interval depending upon the second timing circuit Rf and capacitor $C_2$ is terminated. After the flash unit has once operated, the neon tube Ne is extinguished causing capacitor $C_1$ to be discharged through diode $D_2$, thereby element LN is no more lighted. This element LN is not lighted until the flash unit is again made ready for flashing operation.

The safety means such as switch Sa and capacitor CN function as follows. When the main switch of flash unit F is opened, switch Sa is opened to prevent the triggering of flash-tube Ls when the main capacitor Cm is sufficiently charged. At the same time, the exposure control system is switched to the daylight exposure range, with photosensitive element P being connected thereto so that the timed interval is made dependent on the level of brightness of an object being photographed. As is understood from the above, with a camera associated with the flash unit F, it is possible to make an exposure for daylight photography.

The capacitor CN serves to prevent the premature initiation of dicharge of main capacitor Cm which would otherwise occur as in the prior art flash unit, when synchro-switch X is closed despite of the fact that the main capacitor Cm is not sufficiently charged as detected by the neon tube. Unlike the prior art, the flash unit F shown in FIG. 2a does not operate with the closed synchro-switch X, when the neon tube Ne is not lighted, because the condensor CN is not charged. So long as the capacitor CN is not charged to a certain voltage, the flash exposure control system C remains unswitched to the flash exposure range.

The flash exposure control system C may be used with a bulb type flash unit as shown in FIG. 2b, wherein a flash bulb Lb mounted in a receptor 6 is connected across a power source or battery Vb through a series-connected capacitor Cb and resistor Rb, so that capacitor Cb is gradually charged through resistor Rb and the filament of flash bulb L$b$. In this case, resistor R$b$ has such a resistance value that a current sufficiently large to activate the bulb L$b$ is not allowed to flow through the battery circuit. When the capacitor C$b$ is sufficiently charged to make the flash unit ready for flashing operation, the flash exposure control system is switched to the flash exposure range. When synchro-switch X is closed to short-circuit the terminals A$f$ and B$f$ connected across capacitor C$b$ through flash bulb L$b$, the flash bulb is lighted. It is preferred for the camera side circuit to select a battery of a voltage equal to that developed across resitor R$s$ series connected to neon tube N$e$ for employment as the power source V$b$ for flash bulb L$b$.

Figure 3B:
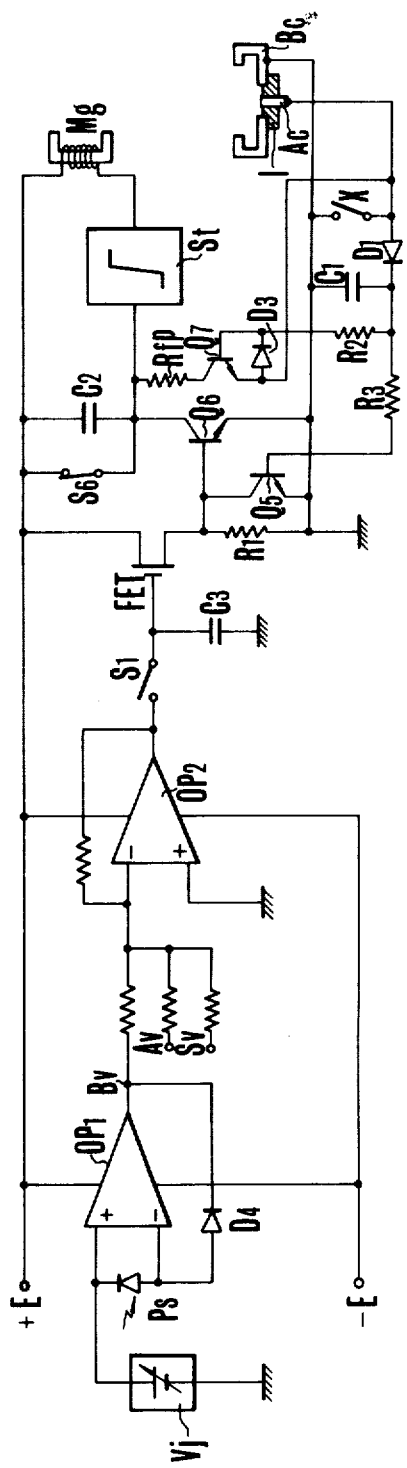

Referring now to FIG. 3$a$, there is schematically shown the operating principle of a two-curtain type focal plane shutter, wherein the front curtain runs down at a rate indicated by curve A, while the rear curtain runs down at a rate indicated by curve B. Such an inertia of the shutter results in a considerably small proportion of a fractional exposure integral effected in a time interval during which the exposure aperture is fully opened relative to the entire exposure integral effected during the entire exposure operation of the shutter. For this reason, the commonly available focal plane shutter is so constructed that the effective exposure interval may be defined by the timed interval, $t$, between the times when the running movements of the front and rear curtains are respectively initiated. For the purpose of making an exposure under a flash lighting condition, and particularly under a complex lighting condition with flash and daylight ambient illumination, it is desirable to employ as fast a shutter speed as possible, while insuring that the time interval during which the exposure aperture is fully opened is maintained on the order of a few milliseconds. With the focal plane shutter, the maximum possible shutter speed for this purpose is practically on the order of 1/60 second. For this reason, with the prior art flash exposure control system combined with a focal plane shutter having an aperture fully opened time interval, $t'$, smaller than the generally available time interval, $t$, at the shutter speed setting of 1/60 second, it has sometimes happened that a portion of the film frame being exposed is blocked by the rear curtain before the flash lighting condition is created as indicated by curve C. Further, because of different rates of running movement of curtains with different focal plane shutters, with a shutter of a relatively large inertia, it has sometimes happened that when the shutter is adjusted to a shutter speed setting of 1/60 second, the fully opened exposure aperture can not be secured during the exposure operation. Furthermore, it is very difficult to assemble the synchro-switch X with the shutter operating means in a fashion such that the synchro-switch is closed with high reliability just when the front curtain is fully opened. Therefore, it has been the prior art practice to actuate the initiation of closure of the synchro-switch in a certain period of time after the front curtain has run down to the fully opened position. The provision for such means requires that the shutter be manufactured within severe tolerances of design parameters and assembled in high accuracy. All of these conventional problems can be eliminated by the present invention as will be explained in connection with FIG. 3$b$.

FIG. 3$b$ shows a fifth example of the embodiment of the invention as applied to a camera having a two-curtain type focal plane shutter. Although the principle of function of this example is effective when applied to any type of lens shutter, it is particularly adapted for cooperation with a focal plane shutter which is usually employed in a single lens reflex camera by taking into consideration unstable operations of the shutter curtains, and is characterized by the capability of actuating the flash unit in synchronism with the fulfilment of running down movement of the front curtain to the fully opened position, and of simultaneously actuating a timing circuit controlling the period of actuation of the shutter in the fully open position in a predetermined manner.

The flash exposure control system of FIG. 3$b$ comprises a constant voltage bias source V$j$, a photo diode such as a SBC element connected between two inputs of an operational amplifier OP$_1$ with a feedback diode D$_4$ connected between one of the inputs and the output thereof, the latter being connected to an input of a second operational amplifier OP$_2$ having a function of performing an Appex computation in response to signals formed with diaphragm value and with film speed setting resistors A$v$ and S$v$ as well as to the output from the first operational amplifier OP$_1$, a memory capacitor C$_3$ connected one pole to the output of the second operational amplifier OP$_2$ through a switch S$_1$, and to a field effect transistor FET, of which the output terminal is connected to a Schmitt type trigger circuit for controlling the period of actuation of the solenoid of electromagnet M$g$, through a transistor Q$_6$ constituting part of an electronic circuit-transfer switch network, transistor Q$_6$ corresponding to transistor Q$_3$ of the network shown in FIGS. 1 and 2, and transistors Q$_5$ and Q$_7$ corresponding to transistors Q$_1$ and Q$_2$ respectively.

With this system in combination with a flash unit attached to the camera at the accessary shoe, the operation proceeds as follows. When the flash unit is ready for flashing operation, a critical voltage is applied between terminals A$c$ and B$c$ to render conducting transistor Q$_5$ of detector circuit which in turn renders transistor Q$_6$ non-conducting, thereby the trigger circuit S$t$ is made unresponsive to the output of the second operational amplifier which represents the exposure interval for daylight photography. Upon actuation of the shutter release member, a switch S$_6$ connected across capacitor C$_2$ is opened in synchronism with initiation of movement of the front curtain, but the charging of capacitor C$_2$ is not initiated yet, because transistor Q$_6$ is in the non-conducting state when the flash unit is ready for flashing. As the front curtain is moved to the fully opened position, the synchro-switch X is closed to trigger the flash unit, thereupon the emitter potential of transistor Q$_7$ is dropped to render it conducting which in turn establishes a timing circuit C$_2$ and R$fp$. The trigger circuit S$t$ is receptive of the output of the timing circuit, and is responsive to attainment of the trigger voltage of capacitor C$_2$ to a threshold level to actuate the solenoid of electromagnet M$g$ in a very short time interval from the time when the exposure aperture is fully opened, thereby the flash exposure is terminated. In this case, the timed interval depends upon the design parameters of resistor R$fp$ and capacitor C$_2$ which are specified by taking into account the time interval during which the exposure aperture is fully opened and which is defined by $\Delta t$ in FIG. 3$a$. However, in practice, it has to be modified to a time interval defined by $\Delta t'$ because an initial portion of movement of rear curtain which has no effect on the unblocking of the exposure aperture, and the inertia of magnet must be taken into account. Further, this timed interval must be decreased when the time at which synchro-switch X is closed is displaced to some extent from the time at which the front curtain is fully opened. It is to be noted that a resistor having a very small resistance value may be selected for employment as resistor $Rfp$. The circuit-transfer switch network further includes a diode $D_3$ connected between the emitter and base of transistor $Q_7$ for protecting the network from damage when a high voltage is applied between terminals $Ac$ and $Bc$ from the associated flash unit.

The operation of the flash exposure control system set in the daylight exposure range is as follows. Such setting is effected when no flash unit is attached to the camera, or when the operative condition of the flash unit attached to the camera is not sufficient. When the camera is aligned with an object being photographed, the photo-sensitive element Ps such as SBC element produces a voltage proportional to the object brightness level and this voltage after slightly modified by the information input means Vj responsive to the maximum possible lens aperture size is applied to the first operational amplifier $OP_1$, which then derives an output signal representing the object brightness information $Bv$. Responsive to the signal $Bv$ and signals $Av$ and $Sv$, the second operational amplifier $OP_2$ derives an output indicative of an exposure value or a shutter speed which is then stored in capacitor $C_3$ through the normally closed switch $S_1$.

Upon actuation of the shutter release member, switch $S_1$ is opened, and then switch $S_6$ is opened to charge capacitor $C_3$ from the power source E through transistor EFT and transistor $Q_6$ in a rate depending upon the voltage of capacitor $C_3$. When the voltage of capacitor $C_2$ has reached the trigger voltage of trigger circuit St in a timed interval, the solenoid of electromagnet Mg is deenergized to terminate the timed interval, thereby a correct exposure is made with daylight ambient illumination.

As will be seen from the foregoing description that the embodiment of the invention comprises an electronic circuit-transfer switch network responsive to the fulfilment of preparatory operation of the flash unit to automatically switch the camera from the automatic daylight exposure range to the flash exposure range without any manupulation of the shutter dial and the like. For example, it has been the prior art practice in the switching of the camera of the type provided with a diaphragm preselection automatic exposure range or having a so-called electronic shutter to the flash exposure range to manupulate a particular shutter speed setting member by which the camera is initially manually adjusted to a particular shutter speed setting, for example, 1/60 second setting, or otherwise the camera would be adjusted to a longer exposure time setting when the photographic object is so dark as to require the flash illumination. According to the embodiment described and illustrated above, such a manipulation is not necessary to switch the camera between the automatic daylight and flash exposure ranges.

In the case of a camera of the type equipped with a shutter preselection automatic exposure range, several failures may be encountered with conventional cameras. For example, with a camera accidentally set to a longer shutter speed setting, defocused photographs will be taken by introducing the vibration of the hand to the camera. Conversely, the camera is adjusted to a faster shutter speed setting such as 1/1000 second setting, while nevertheless the shutter is of the focal plane type, or while nevertheless the flash unit is of the bulb type which operates in a relatively longer flashing period. Further, although the camera is initially adjusted to a proper shutter speed setting for example 1/60 second setting for flash photography, the shutter dial is accidentally moved during the course of flash exposure operations. With a camera employing the flash exposure control system according to the present invention, there is no possibility of encountering the above-mentioned conventional failures. The adjustment of the shutter dial which would be necessary with the prior art camera for setting the camera to the flash exposure range is a rather time-consuming manupulation which is not required with the camera of the present invention. Furthermore, the camera with the flash unit attached thereto may be used in the automatic daylight exposure range provided that the flash unit is not made ready for flashing condition.

ALTERNATE EMBODIMENT

Figure 4:
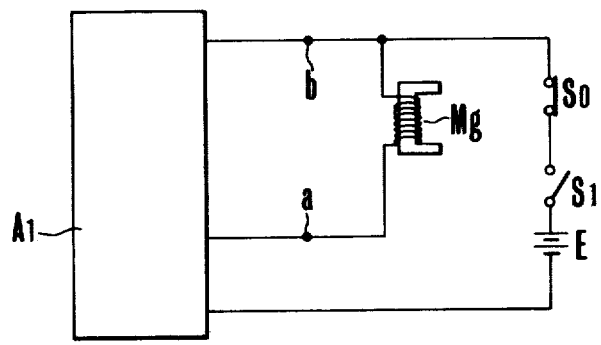
FIG. 4 is a schematic view illustrating an essential electrical circuitry of an alternate embodiment of the invention.
Figure 5:
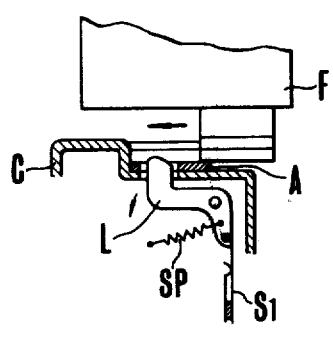
FIG. 5 is a partly elevational partly sectional view of an automatically operating mechanical switch usable in the circuit of FIG. 4.
Figure 6:
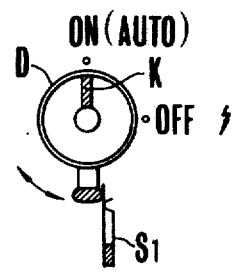
FIG. 6 is a perspective view of a manually operable switch usable in the circuit of FIG. 4.
Figure 13:
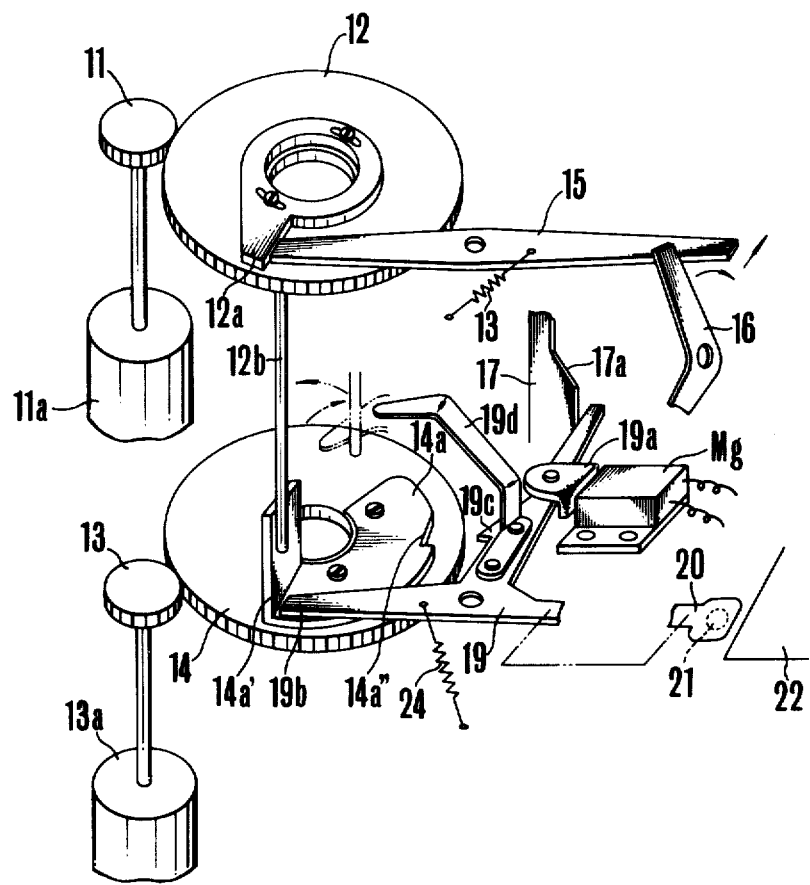
FIG. 13 is an exploded perspective view of a mechanical timing device of the invention incorporated in a two-curtain type focal plane shutter.

Referring now to FIGS. 4, 5 and 13, there is shown a first example of the alternate embodiment of a flash exposure control apparatus for a camera having an electrically timed shutter according to the present invention. The electrical circuit of the flash exposure control apparatus is shown in FIG. 4, where a conventional exposure control circuit $A_1$ having an electromagnet Mg controlling the operation of the rear curtain of a focal plane shutter is connected to a power supply source or battery E through two series-connected switches So and $S_1$, power switch So being arranged in the camera housing to be closed in response to the actuation of shutter release member, and the latter being arranged in the accessory shoe of the camera to be opened in automatic response to attachment of a flash unit to the camera at the shoe as shown in FIG. 5. As the flash unit F is attached to the camera housing C in sliding movement along the guide A provided in the accessory shoe in a direction indicated by an arrow, a lever L having one end extending into the shoe is turned in a counter-clockwise direction as viewed in FIG. 5 against the force of a spring Sp, while a pin extending from the other end of lever L normally engaging with the movable contact of the normally closed switch $S_1$, thereby switch $S_1$ is opened to cut off the exposure control circuit $A_1$ from battery E. Instead of using the automatically operating switch $S_1$ of FIG. 5, a manually operable switch $S_1$ may be used as shown in FIG. 6, wherein a control knob D having an index K is movably mounted in the camera housing. When the knob D is turned to place the index K in registry with symbol "ON (Auto)", switch $S_1$ is closed, while when knob D is turned to place the index K in registry with symbol "OFF," switch $S_1$ is opened to switch the camera to the automatic flash exposure range.

FIG. 13 shows an example of the construction and arrangement of the mechanical timing device for a flash exposure control apparatus of the invention as associated with a focal plane shutter operating mechanism. The focal plane shutter operating mechanism includes front and rear curtain winding drums 11a and 13a fixedly mounted on shafts having gears 11 and 13 fixedly mounted on one ends thereof respectively, and larger drive gears 12 and 14 rotatably mounted on a common shaft not shown and engaging with gears 11 and 13 respectively. When the shutter is cocked, a pawl disc 12a fixedly coaxially mounted on gear 12 is brought into abutting engagement with one end of a two-armed lever 15 which is biased in a clockwise direction as viewed in FIG. 13 by a spring 23 which urges the opposite end of lever 15 for normally abutting engagement with one end of a lever 16 cooperating with a not shown mirror drive mechanism. The rear curtain drive gear 14 fixedly carries a cam disc 14a having an upwardly extending projection 14a' and a notch 14a'', the parts 14a' and 14a'' being arranged for cooperation with a four-armed control lever 19 at one end 19b thereof and at a pawl 19c thereof respectively. The end of another arm 19d of lever 19 extends into the path of movement of a pin 12b eccentrically downwardly extending from the front curtain drive gear 12, so that when gear 12 is rotated in a counter-clockwise direction until the front curtain runs down to the fully opened position, lever 19 is turned clockwise by engagement at the lever arm 19d with the pin 12b from the position indicated by dashed lines to the position indicated by the solid lines. Another arm of lever 19 carries an armature 19a fixedly mounted thereon to be cooperative with the electromagnet Mg of FIG. 4, and its end extends to abuttingly engage with a camming surface of a slide 17 operatively connected with a shutter release member not shown under the action of a bias spring 24 when electromagnet Mg is deenergized. The other arm of lever 19 has a shield plate 20 mounted at the end thereof and arranged in or near the effective field 22 of view finder of the camera to be displaced from the shielding or blocking position, where a display element 21 is shielded by plate 20 to an unshielding or unblocking position in response to the downward movement of slide 17, when electromagnet Mg is deenergized. The members 12b, 14a, 19 and 24 constitute the essential part of the mechanical timing device of the invention.

The operation of the flash exposure control apparatus of FIGS. 4, 5 and 13 is as follows. In order to make an exposure in the automatic daylight exposure range without using any flash unit, the camera operator may depress the shutter release member causing slide 17 to be moved downwardly, thereby the power switch So is closed to energize the solenoid of electromagnet Mg in a manner known in the art. Upon energization of the solenoid, the control lever 19 is latched in the position illustrated in FIG. 13. The downward movement of the shutter release member also causes movement of the mirror drive mechanism and the diaphragm control mechanism which result in the upward pivoting movement of the reflex mirror and in the automatic adjustment of the diaphragm aperture, thereby lever 16 is turned clockwise to turn lever 15 counter-clockwise against the force of spring 23. Such movement of lever 15 results in disengagement of its lever end from the pawl of pawl disc 12a which in turn causes the front curtain to run down, thereby an exposure is initiated. As the front curtain runs down, a not shown count switch provided in the exposure control circuit $A_1$ is turned off in a manner known in the art. In a time interval depending upon the object brightness level after the initiation of the exposure, the solenoid of magnet Mg is deenergized permitting control lever 19 to be turned counter-clockwise under the action of spring 24. Such counter-clockwise movement of lever 19 results in disengagement of lever end 19b from projection 14b of cam disc 14, which in turn causes the rear curtain to runs down, thereby the exposure is terminated.

In order to make an exposure in the automatic flash exposure range by use of a flash unit, the flash unit is first attached to the camera at the accessory shoe, thereby the lever L of FIG. 5 is turned clockwise to turn off switch $S_1$. Next, the camera operator may depress the two-step shutter button not shown to the first step, thereby the power switch So is closed, but the solenoid of electromagnet Mg is not energized because switch $S_1$ is open so that control lever 19 is not latched by electromagnet Mg. This depression of the shutter button also causes downward movement of slide 17, which in turn causes the control lever 19 to turn counter-clockwise under the action of spring 24 in sliding engagement with the tapered portion of the camming surface 17a until the pawl 19c of lever 19 enters the notch 14a'' of cam disc 14. Such counter-clockwise movement of lever 19 also causes disengagement of lever end 19b from extension 14a' and causes displacement of shield plate 20 from the blocking position which teaches the operator looking through the view finder that the camera is switched to the flash exposure range. Upon further depression of the shutter button to the second step, the mirror drive mechanism and diaphragm control mechanism are actuated to move the mirror to the non-viewing position and to adjust the lens aperture to the preselected size, thereby latch lever 15 is turned counter-clockwise in engagement with lever 16. As lever 15 is turned, the gear 12 is released from its latched position permitting the front curtain to run down, thereby an exposure is initiated. After the front curtain has run down to the fully opened position, the synchro-switch is closed in a manner known in the art to trigger the flash tube. As the gear 12 is rotated counter-clockwise direction, the pin 12b strikes the end of lever arm 19d so that lever 19 is turned clockwise to disengage pawl 19c from notch 14a'' of cam disc 14a causing the rear curtain to run down, thereby the exposure is terminated. In this example of the alternate embodiment, the timed interval by the mechanical timing device is made between the time when the exposure aperture is fully opened and the time when control lever 19 is turned clockwise by engagement with pin 12b at the lever end 19d. However, this timed interval may be elongated by the use of a governor arranged to be brought into operation with the timing device in synchronism with the initiation of running down movement of the front curtain. The automatically operating cut-off switch $S_1$ of FIG. 5, may be replaced by the manually operable switch of FIG. 6. The arrangement of switch $S_1$ in the circuit of FIG. 4 may be changed as connecting it between points, a, and, b.

FIG. 14 shows a modification of the mechanical timing device of FIG. 13, wherein like numerals are employed to denote the same parts as those of FIG. 13. The timing device of FIG. 14 is different from that of FIG. 13 in that the notch 14a'' of cam disc 14 is omitted and instead a cam lever 25 and a latch lever 27 for preventing mis-operation of the electronic shutter circuit are used.

The operation of the modified flash exposure controls apparatus of FIG. 14 is as follows. In order to make an exposure in the automatic daylight exposure range without using any flash unit, the camera operator may depress the shutter release member causing slide 17 to be moved downward, thereby the power switch is closed in a manner known in the art to energize the solenoid of electromagnet Mg. Upon energization of the solenoid, the control lever 19 is latched in the position illustrated in FIG. 14. The downward movement of the shutter release member also causes movement of the mirror drive mechanism and the diaphragm control mechanism which result in the upward pivoting movement of the reflex mirror and in the automatic adjustment of the diaphragm aperture, thereby lever 16 is turned clockwise causing lever 15 to be turned counter-clockwise against the force of spring 23. Such counter-clockwise movement of lever 15 causes disengagement of its lever end from the pawl of pawl disc 12a which in turn causes the front curtain to run down, thereby an exposure is initiated. In an initial portion of the counter-clockwise movement of gear 12, a pawl lever 27 is instantaneously caused to be turned in a clockwise direction by engagement at the end 27a with pin 12b, thereby the count switch Sc is instantaneously turned off. In the case of the camera set in the shutter speed preselection automatic exposure range, the solenoid of electromagnet Mg is deenergized in a predetermined time interval after the count switch Sc is turned off, permitting lever 19 to be turned counter-clockwise under the action of spring 24. Such counter-clockwise movement of lever 19 causes disengagement of lever end 19b from the projection 14a which in turn causes counter-clockwise movement of the rear curtain control gear 14, resulting in termination of the exposure. It is to be noted that the counter-clockwise movement of lever 19 also causes clockwise movement of a cam lever 25 in engagement on the camming surface 25a with a pin 19c upwardly extending from lever 19 under the action of spring 28. However, the arrangement of the camming surface 25a and pin 19c is adjusted so that the lever end 19b and lever end 25b do not simultaneously enter the path of movement of the projection 14a' to permit the counter-clockwise movement of gear 14, when the solenoid is deenergized.

In order to make an exposure in the automatic flash exposure range by use of a flash unit, the flash unit is first attached to the camera at the accessory shoe, thereby the lever L of FIG. 5 is turned clockwise to turn off switch $S_1$. Next, the camera operator may depress the two-step shutter button not shown to the first step, thereby the power switch So is closed, but the solenoid of electromagnet Mg is not energized because switch $S_1$ is open, so that control lever is not latched by electromagnet Mg. This depression also causes the control lever 19 to turn counter-clockwise under the action of spring 24 in sliding engagement with the tapered portion of the camming surface 17a until the pawl lever end 19b is moved away from the path of movement of projection 14a'. Such counter-clockwise movement of control lever 19 causes clockwise movement of cam lever 25 under the action of spring 28, as the pin 19c moves along the camming surface 25a, so that the lever end 25b enters the path of movement of projection 14a', and a lever 26 is turned counter-clockwise in engagement at its rectangularly downwardly extending projection 25c with the opposite end of lever 25 to cause the opposite end of lever 26 to enter the path of movement of projection 14a'. The counter-clockwise movement of lever 19 also causes movement of shield plate 20 from the blocking position, which teaches the operator looking through the view finder that the camera is switched to the flash exposure range. Upon further depression of the shutter button to the second step, the mirror drive mechanism and diaphragm control mechanism are actuated to move the mirror to the non-viewing position and to adjust the lens aperture to the preselected aperture setting, thereby latch lever 15 is turned counter-clockwise in engagement with lever 16. As lever 15 is turned, the gear 12 is released from its latched position permitting the front curtain to run down, thereby an exposure is initiated. After the front curtain has run down to the fully opened position, the synchro-switch is closed in a manner known in the art to trigger the flash-tube. On the other hand, as gear 12 is rotated, the latching of projection 14a' by latching of projection 14a' by pin 12b and pawl lever 27 is removed, but gear 14 is prevented from rotating counter-clockwise by the abutting engagement with lever end 25b. When the counter-clockwise movement of gear 12 is terminated to effect the full opening of the front curtain, the pin 12b strikes the lever end 26b, so that cam lever 25 is turned counter-clockwise to disengage the lever end 25b from projection 14a' causing the rear curtain to run down, thereby the exposure is terminated. The pawl lever 27 serves to prevent premature closure of the shutter due to the malfunction of the exposure control circuit controlling the solenoid of electromagnet Mg. For example, assuming that the exposure control is under progress with the electronic shutter control circuit, when the electromagnet Mg is accidentally deenergized just after the actuation of the front curtain operating means, the front and rear curtains are permitted to run down without forming any shutter opening. Such a case can be avoided by the provision of pawl lever 27 arranged so that after the front curtain is actuated, the projection 14a' is disengaged from the pawl of lever 27 by pin 12b in a time interval corresponding to a shutter opening of 1/1000 second. With the timing device of FIG. 14, it is possible to omit the corresponding resistor of the electronic shutter circuit which would be otherwise necessary to derive the minimum exposure interval for flash photography, thereby it being made possible to make an exposure in the automatic flash exposure range with improved reliability.

Figure 7:
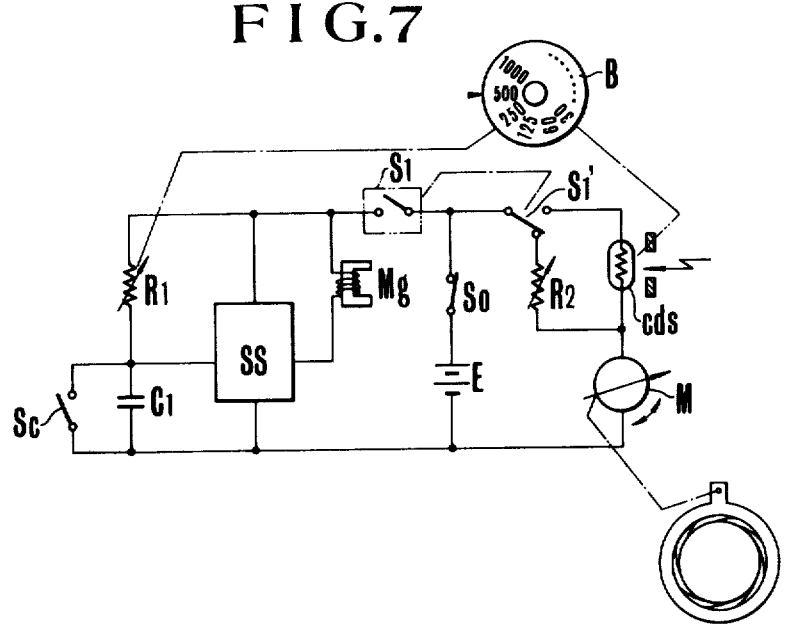
FIG. 7 is a circuit diagram of a first example of the alternate embodiment of the invention adapted for cooperation with a mechanical timing device shown in FIG. 13 or FIG. 14, and as applied to a camera equipped with a shutter preselection automatic exposure range.

FIG. 7 shows a first example of the flash exposure control apparatus employing the mechanical timing device of FIG. 13 or FIG. 14 as applied to a camera of the type provided with the shutter preselection automatic exposure range. The apparatus includes a timing circuit containing a variable resistor $R_1$ of which the resistance value is adjustable in accordance with the preselected shutter speed by a shutter dial B, and a timing capacitor $C_1$ across which a count switch $S_1$ is connected, and a switching circuit receptive of the output of the timing circuit and responsive to attainment of the trigger voltage of capacitor $C_1$ to a threshold level for deenergizing the solenoid of electromagnet Mg. The apparatus further includes a sensor circuit containing a photosensitive element such as CdS connected to an electric meter M in series to a power source or battery E through a power switch So and a transfer switch $S_1$, associated with switch $S_1$ to selectively connect the photosensitive element CdS and a variable resistor $R_2$ to battery E. Element CdS and resistor $R_2$ being connected in aparallel to meter M cooperating with a diaphragm control mechanism to adjust the effective exposure aperture in accordance with the position of the needle of meter M. The resistance value of variable resistor $R_2$ is adjusted in accordance with the camera-to-object distance and guide member.

The operation of the apparatus of FIG. 7 and FIG. 13 or FIG. 14 is as follows. In order to make an exposure in the automatic daylight exposure range without using any flash unit, the camera operator depresses the shutter button to close the power switch So, thereby a current depending upon the object brightness level as sensed by element CdS is allowed to flow through meter M which then determines the size of diaphragm aperture opening. As the front curtain runs down, count switch Sc is turned off to charge the timing capacitor $C_1$ from the battery E through the closed switches So and $S_1$. When the voltage of capacitor $C_1$ has reached the threshold level, the switching circuit SS is triggered to deenergize the solenoid of electromagnet Mg, thereupon the rear curtain begins to run down.

In order to make an exposure in the automatic flash exposure range, a flash unit is attached to the camera at the accessory shoe to turn off switch $S_1$ and to move switch $S_1$, from the "CdS" position to the "$R_2$" position, and then the shuter button is depressed to close the power switch So, thereby a current is allowed to flow through resistor $R_2$ and the meter M, so that the size of diaphragm aperture opening is adjusted in accordance with the camera-to-object distance and the guide number of the used flash unit. Next, the shutter curtains operate successively in a manner similar to that described and illustrated in connection with FIGS. 4, 13 and 14.

Figure 8:
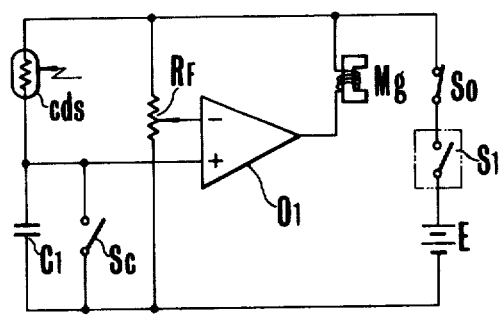
FIG. 8 is a circuit diagram of a second example of the alternate embodiment as applied to a camera equipped with a diaphragm preselection automatic exposure range.

FIG. 8 shows a second example of the flash exposure control apparatus employing the mechanical timing device of FIGS. 13 or 14 as applied to a camera of the type provided with the diaphragm preselection automatic exposure range. The construction and operating function of the apparatus of FIG. 8 are identical to those of the apparatus of FIG. 7, except that there is provided a resistor RF for setting the preselected diaphragm value and film speed in combination with an operational amplifier 01 having two input terminals, one of which is connected to the slider of resistor RF, and another terminal which is connected to the timing circuit containing a photosensitive element CdS and a timing capacitor $C_1$ so that upon attainment of the voltage of capacitor $C_1$ to a threshold level dependent upon the reference voltage applied to the other input terminal, the solenoid of electromagnet Mg is deenergized.

As is evident from the first and second examples of FIGS. 7 and 8, that according to the present invention, the timed interval for flash photography is made by the mechanical timing device which operates independently of the electrical control means for the shutter with improved reliability over the prior art flash exposure control apparatus in which there is provided a fixed resistor arranged to be connected to the operational amplifier of FIG. 8, while the photosensitve element CdS being cut off therefrom, when the camera is switched from the daylight exposure range to the flash exposure range. Further this arrangement of the fixed resistor constituting a timing circuit for flash photography together with the capacitor $C_1$ requires that the variable resistor RF be replaced by a particularly specified resistor when the camera is used in the flash mode. Such inconvenience has been overcome in the present invention.

Figure 9:
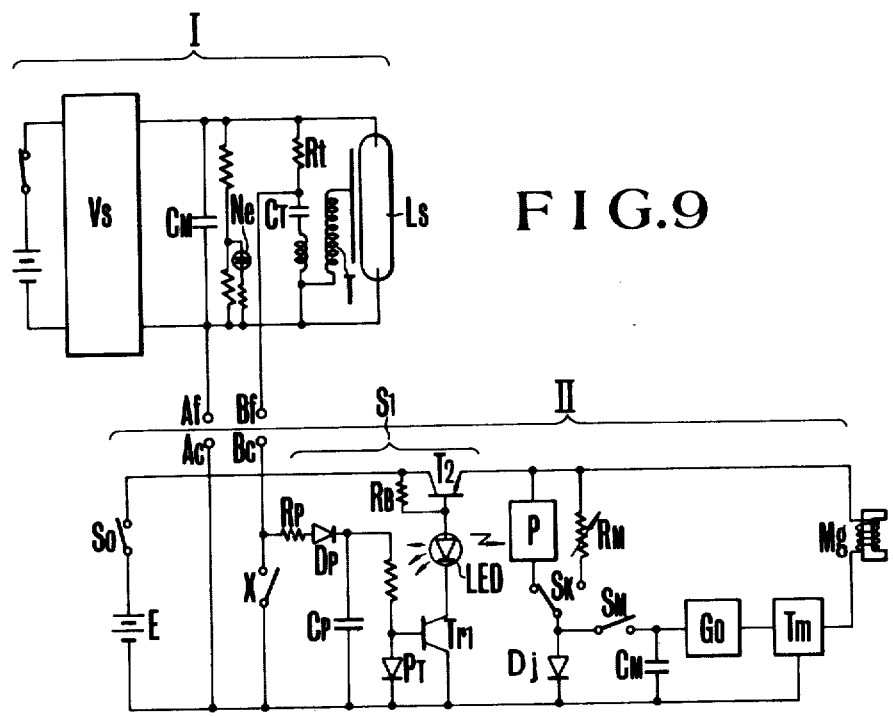
FIG. 9 is a circuit diagram of a third example of the alternate embodiment of the invention wherein the mechanical cut-off switch of FIG. 5

FIG. 9 shows a third example of the alternate embodiment of the invention employing the mechanical timing device of FIGS. 13 or 14 in combination with an electronic cut-off switch by which the camera is switchable to the automatic flash exposure range in response to attachment of a flash unit to the camera. The flash unit I has a trigger and discharge control circuit I similar to that shown in FIG. 1 except that there are further provided a neon tube Ne with its control resistor circuit. The control circuit II for the electrically timed shutter of the camera comprises an electronic cut-off switch $S_1$ cooperating with a detector circuit and connected in the power supply path to the control circuit for the shutter. The control circuit for the shutter comprises a sensor circuit P receptive of diaphragm aperture, film speed and object brightness informations, a variable resistor RM for manual exposure control, a transfer switch Sk arranged to selectively connect sensor circuit P and resistor Rm to one pole of a store capacitor CM through a switch SM, a high input impedance elongation circuit Go having an input connected to the pole of capacitor CM and having an output connected to the input of a timer circuit Tm containing a RC time constant circuit and a switching circuit responsive to the RC circuit for energizing and deenergizing the solenoid of an electromagnet. Mg. The electronic switch $S_1$ comprises a transistor $Tr_2$ with its bias resistor RB connected between the collector and base electrodes thereof, with the emitter and collector electrodes being connected in the power supply path to cut off the path when transistor $Tr_2$ is rendered non-conducting, and with the collector electrode being connected through a power switch So to the positive terminal of a battery E. The detector circuit includes diodes Dp and DT, resistors RP and RA, a capacitor CP and a transistor $Tr_1$ corresponding to the elements $D_1$, $D_2$, $R_1$, $r_2$, $C_1$ and $Q_1$ of FIG. 1 respectively. The collector electrode of transistor $Tr_1$ is connected to the base of transistor $Tr_2$ through a light emitting diode LED which is lighted when the transistor $Tr_2$ is in the non-conducting state, namely when the camera is set in the automatic flash exposure range.

The operation of the flash exposure control apparatus of FIG. 9 and FIG. 13 or FIG. 14 is as follows. With the camera having the flash unit attached thereto, the power switch So is turned on, and then the main switch of flash unit is turned on, to charge the main capacitor CM and trigger capacitor CT from the high voltage power source Vs. The voltage of capacitor CT is applied through terminals Af, Bf and terminal Ac, Bc connections to capacitor CP, so long as the synchro-switch is open. When capacitor CP is charged to a voltage, transistor $Tr_1$ of detector circuit is rendered conducting causing a decrease in the potential of the base of transistor $Tr_2$ of electronic cut-off switch, thereby transistor $Tr_2$ is rendered non-conducting, and accordingly electromagnet Mg is rendered inoperative. The conduction of transistor $Tr_1$ also causes diode LED to be lighted, indicating that the camera is switched to the automatic flash exposure range. When the main capacitor Cm is charged to a critical voltage for the discharging of the flash-tube Ls, the neon tube Ne is lighted to indicate that the flash unit is ready for making a predetermined flash lighting condition. Next, when the shutter button is depressed, the front curtain begins to run down to the fully opened position, and then the synchro-switch is closed to discharge the trigger capacitor CT, through trigger coil T by which the flash-tube is triggered, while being supplied with electrical energy from the main capacitor Cm. In a timed interval after the front curtain is actuated, the rear curtain is permitted to run down in a manner similar to that shown in connection with FIGS. 3 and 14, thereby the exposure is terminated. It is to be noted that, in this example, the power switch S*o* does not operate with the shutter release member.

When the flash unit is detached from the camera, transistor T*r*₁ is rendered non-conducting to extinguish diode LED, and transistor T*r*₂ is rendered conducting, thereby the electromagnet M*g* is rendered operative with the control circuit for the shutter. The subsequent exposure operation proceeds in a manner similar to that shown in connection with FIGS. 13 and 14.

Figure 10:
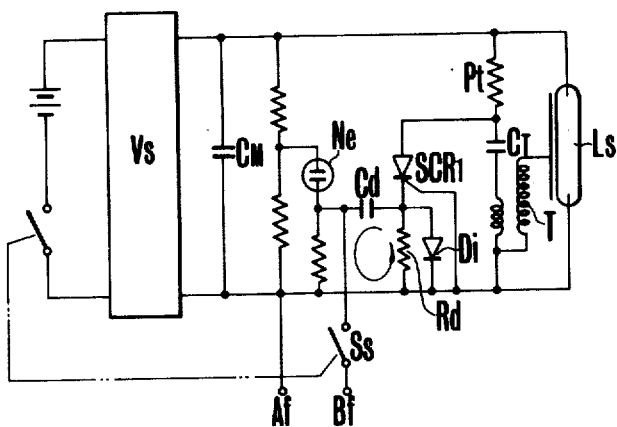
FIG. 10 is a circuit diagram of the flash unit of FIG. 2a usable with the camera-side system section of FIG. 9.

In order to insure that the camera is switched from the automatic daylight exposure range to the automatic flash exposure range only when the flash unit is ready for making a predetermined flash lighting condition, it is preferred to use the flash unit having the trigger and discharge control circuit of FIG. 10. The operation of flash unit of FIG. 10 is readily understandable when the foregoing description is read by reference to FIGS. 2 and 9.

Figure 11:
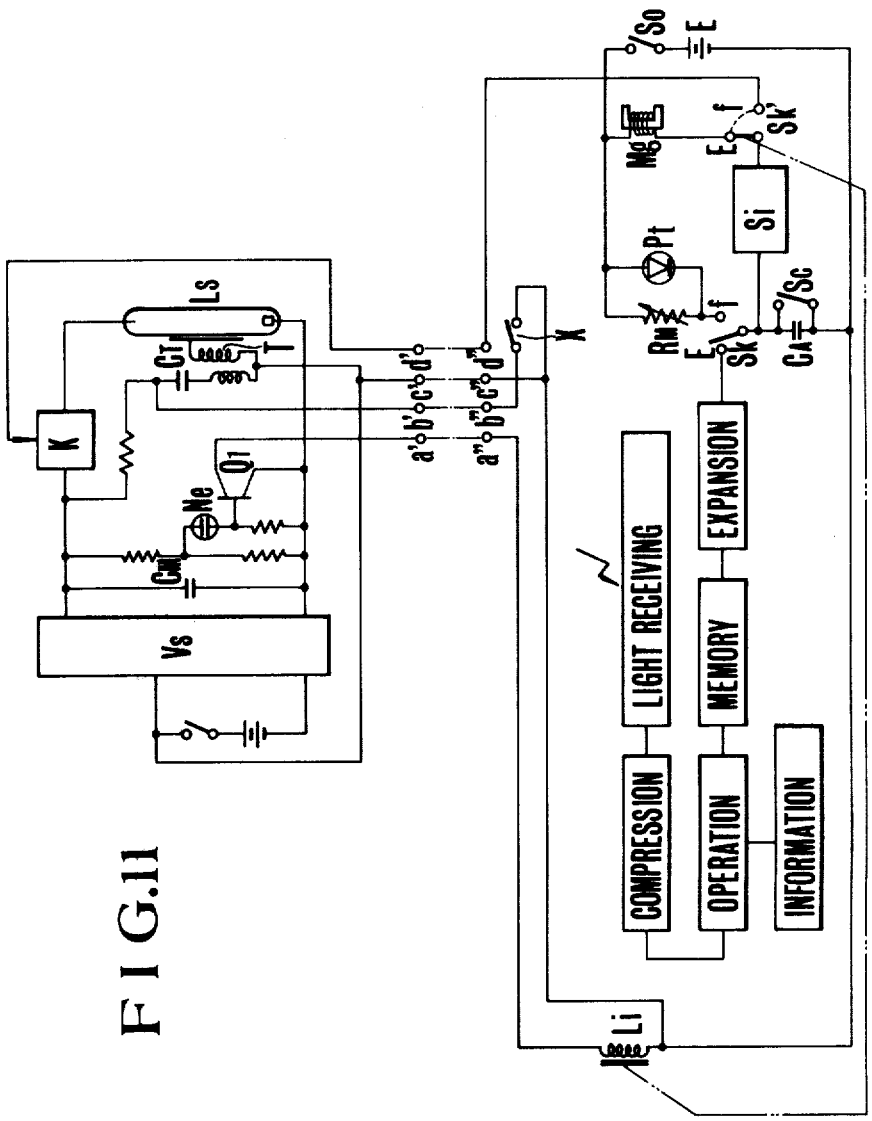
FIG. 11 is a circuit diagram, partially in block form, of a fourth example of the alternate embodiment of the invention, wherein a circuit-transfer mechanical switch assembly in combination with a relay responsive to the operating condition of the associated flash unit is used so that the control means for the electronic shutter serves as the flash energy control means when the camera is switched to the automatic flash exposure range.

FIG. 11 shows a fourth example of the alternate embodiment of the invention in which when the camera is switched from the automatic daylight exposure range to the automatic flash exposure range by actuation of the electronic switch, the control circuit for the electrically timed shutter serves to control the period of actuation of the flash-tube, while the exposure interval is controlled by the mechanical timing device of FIG. 13 or FIG. 14. The circuit of flash unit of FIG. 11 is constructed with the circuit of FIG. 9 as further including a transistor Q₁ having base and emitter electrodes connected across the bias resistor of neon tube N*e* and having a collector electrode connected to a terminal *a'*, and a cut-off switch K connected in the power supply path to the flash-tube L*s* having the control terminal connected to a terminal *d'* arranged in the connector of flash unit.

The circuit of the camera comprises a sensor-and-computor circuit III, a timing circuit, and a switching circuit S*i* having an input selectively connectable through a first circuit-transfer switch S*k* to the timing circuit and the circuit III, and having an output selectively connectable through second circuit-transfer switch S*k'* to the solenoid of electromagnet M*g* and to terminal *d"*. Switches S*k* and S*k'* operate with a relay L*i* connected between terminals *a"* and *b"*. The timing circuit is connected across a battery E through a power switch S*o*, and it contains a timing capacitor CA across which a count switch S*c* is connected, and parallel-connected variable resistor RM and photo-transistor P*t* which are connected through switch S*k* to capacitor CA. The variable resistor RM cooperates with a distance-adjusting ring of the camera, while photo-transistor P*t* is arranged to receive the light reflected from object being photographed in the flash mode. The sensor-and-computer circuit III comprises a light-receiving section, logarithmic convertor section, photographic information setting section, computor section, memory section, and expansion section.

The operation of the apparatus of FIG. 11 is as follows. With the camera having the flash unit attached thereto at the accessory shoe, the terminals *a'* through *d'* of flash unit are respectively connected with terminals *a"* through *d"* of the camera. When the main switch of flash unit is closed, the main capacitor C*m* and trigger capacitor CT are charged from the high voltage power source V*s*. When the main capacitor C*m* is sufficiently charged, the neon tube N*e* is lighted to indicate that the flash unit is ready for making a predetermined flash lighting condition, and to render transistor Q₁ conducting. Upon conduction of transistor Q₁, a current flows through relay coil L*i* to operate transfer switches S*k* and S*k'*, so that they are moved from their "E" positions illustrated in FIG. 11 to their "*f*" positions. Next, the shutter button is depressed to close switch S*o*, while nevertheless electromagnet M*g* remains in the inoperative position because switch S*k'* is set in the position *f*. After the running-down movement of the front curtain to the fully opened position has been completed, synchro-switch X is closed to discharge trigger capacitor CT through synchro-switch X and trigger coil T by which flash-tube L*s* is actuated for discharge with the voltage from voltage source V*s*. In synchronism with the closure of synchro-switch X, count switch S*c* is opened to charge capacitor CA through both of resistor RM and photo-transistor P*t* to a threshold voltage level at which the switching circuit S*i* is triggered to produce a signal, which is applied to the control terminal of cut-off switch K, thereupon duration of actuation of flash-tube L*s* is terminated. On the other hand, in a timed interval after the synchroswitch is closed, the rear curtain begins to run down, thereby the exposure is terminated in a manner similar to that described in connection with FIGS. 13 and 14.

In order to make an exposure in the daylight exposure range without using the flash unit, the shutter button is depressed to close switch S*o*, thereby the electromagnet M*g* is rendered operative. Responsive to the level of brightness of an object being photographed, the light-receiving section derives a voltage which is then logarithmically compressed by the logarithmic convertor. Responsive to the brightness information from the logarithmic convertor as well as to the diaphragm aperture and film speed informations, the computer derives an output signal representing an exposure value or effective shutter speed which is stored in the memory section. After the front curtain runs down to the fully opened position, count switch S*c* is turned off, and the voltage stored in the memory section undergoes expansion in the expansion section to a current corresponding to the current occurring in the light-receiving section when the object brightness level was detected. The current is allowed to flow through switch S*k* to capacitor CA, thereby capacitor is charged to a threshold level at which the switching circuit S*i* is reversed to deenergize the solenoid of electromagnet M*g*, permitting the rear curtain to run down, thereby the exposure is terminated in a manner similar to that shown in connection with FIG. 13 and FIG. 14.

As is evident from this example, the present invention facilitates the minimization of complexity of the flash exposure control system which would be otherwise resulted by the use of additional control means for controlling the period of energization of the flash-tube based on the fact that the timing circuit and switching circuit of the control means for the electrically timed shutter are utilized in controlling the amount of flash energy available from the flash unit when the camera is used in the flash mode. It is also possible to utilize the electrical control means for the shutter for other purposes.

Figure 12:
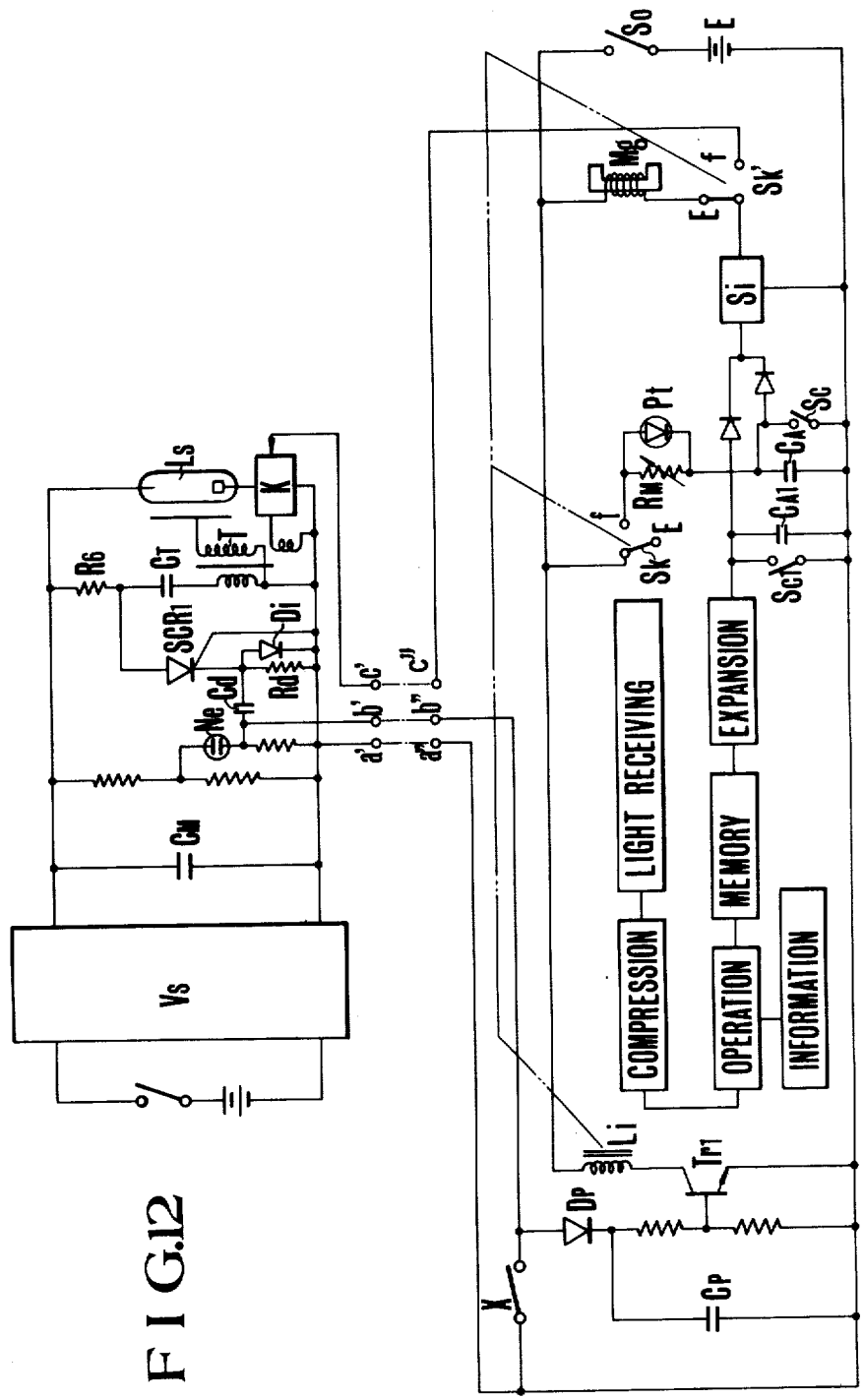
FIG. 12 is a circuit diagram of a fifth example of the alternate embodiment of the invention somewhat similar in function to the fourth example of FIG. 11.

In order to insure that the camera is switched from the automatic daylight exposure range to the automatic flash exposure range only when the flash unit is ready for making a predetermined flash lighting condition, the apparatus of FIG. 11 may be modified as shown in FIG. 12, wherein the circuit of flash unit is constructed with the circuit of FIG. 2 or FIG. 10 as further including a cut-off switch K connected in the cathod circuit of flash-tube Ls and having a control terminal for connection with the output of the switching circuit of the control means for the electrically timed shutter in the camera. Further the arrangement of relay Li is modified as connected in the collector state of transistor $Tr_1$ of the detector circuit of which construction is somewhat similar to that of FIG. 9, and the arrangement of switch Sk is modified as connected between the positive bus and the timing circuit RM, Pt and Ca, while an additional capacitor $CA_1$ with its switch $Sc_1$ connected thereacross are employed for cooperation with the sensor-and-computer circuit III of FIG. 11.

As described above, the present invention is very useful in that the device is automatically adjusted to the shutter time for flash photographing only at the time when the flash photographing preparation is completed and thus no erroneous photographing is caused.

Further according to the present invention, the magnet for holding the rear screen in the electronic shutter circuit of the camera is made non-operative mechanically by attaching the flash device to the camera at the time of flash photographing, or electrically at the time when the preparation of the flashing of the flash device is completed, and the change over from the shutter time control by the electronic shutter circuit to the mechanical time control is automatically effected at the time of flash photographing, so that it is not necessary to set the shutter dial to the shutter time for flash photographing, and thus it is possible to prevent the erroneous photographing due to the erroneous setting of the shutter dial, and further it is possible to effect the flash photographing even without a power source for the camera, thus permitting an ordinary photographing. In this way, the present invention can be used in a very wide application.

The present invention should not be limited to the embodiments shown, but can be modified without deviating from the scope of the present invention.

What is claimed is:

1. An exposure control system for a photographic apparatus comprising:
   A. an electronic flash device;
   B. electrical energy storing means for flash illumination;
   C. means for causing the electrical energy of said storing means to be discharged through said flash device, thereby a photographic subject is illuminated with flash light from said flash device;
   D. detecting means connected to said storing means for detecting the attainment of a predetermined voltage developed by said stored charge of said storing means as the critical level for assuring the firing of said flash device;
   E. shutter means for unblocking and blocking an exposure aperture to establish an exposure interval;
   F. shutter adjusting means operatively connected to said shutter means for adjusting said shutter means to one of at least two settings of different exposure interval, said possible settings providing corresponding exposure intervals including one suited for taking photographs with flash illumination from said firing flash device and one not suited for making an exposure in flash mode but for use in daylight photography;
   G. automatic changeover means responsive to an output signal of said detecting means and associated with said shutter adjusting means for selectively switching said adjusting means to an operative condition providing said flash exposure interval automatically in response to attainment of the voltage of said storing means to said critical voltage level of said flash device, whereby said shutter means is adjusted to the setting providing said flash exposure interval.

2. An exposure control system according to claim 1, wherein said shutter adjusting means includes:
   a. time constant means electrically connected to said switch means for selectively forming a time constant dependent upon the level of brightness of said photographic subject and a time constant corresponding to the exposure interval suited for use in the flash mode;
   b. electronic switching means receptive of the output of said time constant means and responsive to attainment of the output of said time constant means to a threshold level; and
   c. electromagnetic means electrically connected to said switching means and operatively associated with said shutter means for controlling the blocking operation thereof.

3. An exposure control system according to claim 2, wherein:
   a. said time constant means includes:
      1. capacitance means;
      2. photosensitive means arranged to be selectively connectable to said capacitance means and having a resistance valve dependent upon the level of brightness of the photographic subject; and
      3. resistance means arranged to be selectively connectable to said capacitance means and having a resistance value corresponding to the exposure interval suited for use in the flash mode; and
   b. said changeover means includes:
      switch means connecting at least one of said photosensitive means and said resistance means to said capacitance means, and electrically connected to said detecting means.

4. An exposure control system according to claim 3, wherein;
said photosensitive means is a photoconductive cell connected in series with said switch means.

5. An exposure control system according to claim 2, wherein said detecting means has one-way conducting means connected to said changeover means and connected to said electronic switching means in a manner to permit a current flowing to said switching means.

6. An exposure control system according to claim 2, wherein said detecting means includes a voltage compression circuit for compressing the voltage of said storing means in a predetermined ratio.

7. An exposure control system according to claim 1, wherein said shutter means is a focal plane shutter having front and rear curtains.

8. An exposure control system according to claim 1, wherein said shutter adjusting means has variable resistor means arranged to provide a range of time constants corresponding to a plurality of shutter times.

9. An exposure control system for a photographic apparatus comprising:
   A. an electronic flash device;
   B. electrical energy storing means;

C. means for causing the electrical energy of said storing means to be discharged through said flash device, thereby a photographic subject is illuminated with flash light from said flash device;

D. detecting means connected to said storing means for detecting the level of voltage of said storing means relative to the critical voltage level at which said flash device can be activated;

E. shutter means for unblocking and blocking an exposure aperture to establish an exposure interval;

F. shutter adjusting means operatively connected to said shutter means for adjusting said shutter means to one of at least two settings of different exposure interval, said possible settings providing corresponding exposure intervals including one suited for taking photographs with flash illumination from said activated flash device and one not suited for making an exposure in flash mode, and wherein said shutter adjusting means includes:
  a. time constant means electrically connected to said switch means for selectively forming a time constant dependent upon the level of brightness of said photographic subject and a time constant corresponding to the exposure interval suited for use in the flash mode, wherein said time constant means includes:
    1. capacitance means;
    2. photocell means arranged to receive light from the photographic subject;
    3. a light metering circuit containing said photocell means, said circuit further containing variable resistance means arranged to provide different resistance values with different outputs from said photocell means, said variable resistance means being selectively connected to said capacitance means; and
    4. resistance circuit means arranged to be selectively connectable to said capacitance means and capable of contributing to said time constant means a resistance value corresponding to the exposure interval suited for use in the flash mode;
  b. electronic switching means receptive of the output of said time constant means and responsive to attainment of the output of said time constant means to a threshold level; and
  c. electromagnetic means electrically connected to said switching means and operatively associated with said shutter means for controlling the blocking operation thereof;

G. changeover means receptive of the output of said detecting means and associated with said shutter adjusting means for selectively switching said adjusting means to an operative position providing said flash exposure interval in automatic response to attainment of the voltage of said storing means to said critical voltage of said flash device, whereby said shutter means is adjusted to the setting providing said flash exposure interval, and said changeover means includes means electrically connecting said resistance circuit means to said changeover means.

10. An exposure control system according to claim 9, wherein said light metering circuit includes:
  1. an exposure value computing circuit responsive to the output of said photo-cell means; and
  2. memory means having an input connected to the output of said computing circuit.

11. An exposure control system according to claim 9, wherein said sensor control circuit further includes variable resistor means arranged to provide a range of time constants corresponding to a plurality of shutter times.

12. An exposure control system for a photographic apparatus comprising:

A. an electronic flash device;

B. electrical energy storing means;

C. means for causing the electrical energy of said storing means to be discharged through said flash device, thereby a photographic subject is illuminated with flash light from said flash device;

D. detecting means connected to said storing means for detecting the level of voltage of said storing means relative to the critical voltage level at which said flash device can be activated;

E. shutter means for unblocking and blocking an exposure aperture to establish an exposure interval;

F. shutter adjusting means operatively connected to said shutter means for adjusting said shutter means to one of at least two settings of different exposure interval, said possible settings providing corresponding exposure intervals including one suited for taking photographs with flash illumination from said activated flash device and one not suited for making an exposure in flash mode, said shutter adjusting means including:
  a. electronic timing means for electronically controlling the operation of said shutter means, and
  b. mechanical timing means for mechanically controlling the operation of said shutter means to establish at least one exposure interval suited for use in said flash mode;

G. changeover means receptive of the output of said detecting means and associated with said shutter adjusting means for selectively switching said adjusting means to an operative position providing said flash exposure interval in automatic response to attainment of the voltage of said storing means to said critical voltage of said flash device, whereby said shutter means is adjusted to the setting providing said flash exposure interval.

13. An exposure control system according to claim 12, wherein:
  a. said shutter means includes:
    1. a front shutter curtain control mechanism for initiating an exposure interval at the time of shutter release;
    2. a rear shutter curtain control mechanism for terminating the exposure interval at the time of actuation thereof; and
  b. said mechanical timing means includes:
    delay means operatively associated with said front and rear curtain control mechanism upon response to an actuation of said front curtain control mechanism to actuate said rear curtain control mechanism in a predetermined time interval after said actuation; and
  c. said electronic timing means includes:
    electromagnetic means operatively connected to said delay means.

14. An exposure control system according to claim 13, wherein said electronic timing means includes:
  1. an electrical power source;

2. a cut-off switch connected between said electrical power source and said electromagnetic means to be turned on when photographs are taken in the flash mode.

15. An exposure control system according to claim 13, wherein
   a. said changeover means includes:
      relay means electrically connected to said detecting means upon attainment of the voltage of said storing means to the critical level to be operated; and
   b. said electronic timing means has a switch connected to said electromagnetic means and cooperating with said relay means.

16. A photographic camera adapted for use in flash photography with a flash unit associated therewith; said flash unit having a flash-tube which is discharged with supply of once stored electrical energy to produce flash illumination, said camera comprising:
   A. a housing;
   B. shutter means incorporated in said housing for unblocking and blocking an exposure aperture to establish an exposure interval;
   C. shutter adjusting means operatively connected to said shutter means for adjusting said shutter means to one of at least two possible settings of different exposure interval, said adjusting means including:
      a. electronic timing means provided with a time constant circuit and an electronic switching circuit receptive of the outut of said time constant circuit and responsive to attainment of a threshold level for actuating electromagnetic means operatively connected with said shutter means to control the period of actuation of said shutter means; and
      b. at least one electronic changeover switch associated with said time constant circuit upon actuation to set said time constant circuit to selected two different time constants, one of the selected time constants corresponding to the exposure interval suited for flash photography and the other time constant corresponding to the exposure interval not suited for flash photography;
   D. electrical level detecting means receptive of an electrical input signal and responsive to attainment of a threshold level higher than the critical voltage for the discharging of said flash-tube for producing a control output signal which is directed to said changeover switch;
   E. electrical terminal means fixedly mounted on said housing and extending therefrom for electrical connection with the circuit of said flash unit, said terminal means being connected to said detecting means; and
   F. said detecting means being electrically connected to said electronic changeover means, whereby when the critical voltage for said flash-tube is established, said shutter means is automatically adjusted to said flash exposure interval setting.

17. A photographic camera according to claim 16, wherein said time constant circuit contains a photocell means of which the resistance value depends on the level of brightness of an object being photographed.

18. A photographic camera according to claim 16, wherein said terminal means is located in a shoe member mounted on said camera housing at which said flash unit is attached to the camera.

19. A photographic camera according to claim 16, wherein said level detecting means is comprised of at least one transistor circuit means having a one-way conducting element connected to said terminal means.

20. A photographic camera according to claim 16, wherein
   a. said time constant circuit has:
      1. photocell means having a resistance value dependent upon the object brightness level;
      2. resistance means having a resistance value corresponding to the flash exposure interval; and
      3. capacitance means; and
   b. said electronic changeover means has:
      1. a first switching element connected between said photocell means and said capacitance means; and
      2. a second switching element connected between said resistance means and said capacitance means, said first and second switching elements being arranged to select either of said photocell means and said resistance means for connection to said capacitance means.

21. A photographic camera according to claim 16, further including a light-emitting diode connected between said detecting means and said changeover means and arranged to be visible in the view finder of the camera.

22. A photographic camera according to claim 16, wherein said detecting means has capacitance means connected to said terminal means and across which a synchronous contact of the camera is connected.

23. A photographic camera adapted for use in flash photography with a flash unit associated therewith, said flash unit having a flash-tube which is discharged with supply of once stored electrical energy to produce flash illumination, said camera comprising:
   A. a housing;
   B. shutter means incorporated in said housing for unblocking and blocking an exposure aperture to establish an exposure interval;
   C. shutter adjusting means operatively connected to said shutter means for adjusting said shutter means to one of at least two possible settings of different exposure interval, said adjusting means including;
      1. electronic timing means;
      2. mechanical timing means arranged to be selectively rendered operative for adjusting said shutter means to the setting suited for said flash photography; and
      3. changeover means capable of cutting off said electronic timing means, said changeover means having switch means;
   D. electrical level detecting means receptive of an electrical input signal and responsive to attainment of a threshold level higher than the critical voltage for the discharging of said flash tube for producing a control output signal which is directed to said changeover switch;
   E. electrical terminal means fixedly mounted on said housing and extending therefrom for electrical connection with the circuit of said flash unit, said terminal means being connected to said detecting means; and
   F. said detecting means being electrically connected to said switch means upon attainment of the voltage of said once stored electrical energy to said critical voltage level to cut off said electronic timing means, whereby said shutter means is controlled by said mechanical timing means to establish the flash exposure interval.

24. A photographic camera according to claim 23, wherein:
   a. said electronic timing means includes:
      1. an electric power source;
      2. an electronic switching control circuit;
      3. a time constant circuit adjustable to one of at least two time constants; and
      4. an electromagnet arranged upon energization of the solenoid thereof to hold said shutter means in the opened position; and
   b. said switch means is connected in the supply circuit of said electromagnet solenoid.

25. A photographic camera according to claim 23, wherein:
   a. said shutter means includes:
      1. a front shutter curtain control mechanism for initiating an exposure interval at the time of shutter release;
      2. a rear shutter curtain control mechanism for terminating the exposure interval at the time of acutation thereof; and
   b. said mechanical timing means includes:
      delay means operatively associated wih said front and rear curtain control mechanisms upon response to an acutation of said front curtain control mechanism to actuate said rear curtain control mechanism in a predetermined time interval after said actuation; and
   c. said electronic timing means includes:
      electromagnetic means operatively connected to said delay means.

26. A photographic camera according to claim 25, wherein:
   a. said changeover means includes:
      relay means electrically connected to said detecting means upon attainment of the voltage of said storing means to the critical level to be actuated; and
   b. said electronic timing means has a switch connected to said electromagnetic means and cooperating with said relay means.

27. A photographic camera according to claim 23 wherein said shutter adjusting means further includes:
   A. object brightness metering means capable of producing an electrical signal corresponding to the level of brightness of an object being photographed under ambient lighting condition, said electrical signal being applied to said changeover means; and
   B. flash light receiving means capable of producing an electrical signal corresponding to the amount of flash light reflected from said object when illuminated with flash light, said electrical signal being applied to said changeover means.

28. A photographic camera according to claim 23, wherein said electronic timing means has variable means arranged to provide a range of time constant corresponding to a plurality of exposure times.

29. A combination of a photographic camera and a flash unit, said flash unit having a direct-current booster circuit, a main capacitor connected to said booster circuit and a discharge tube connected to said main capacitor, and said camera having an electronic timing device for controlling the period of actuation of the shutter, characterized as including:
   a control circuit responsive to attainment of the voltage of said main capacitor to a voltage higher than the critical anode-to-cathode voltage of said discharge tube for forming a control signal;
   a mechanical timing device for controlling the period of actuation of the shutter in a preselected manner optimum for use in the flash mode; and
   electrical changeover means for cutting off said electronic timing device,
   said control circuit and said electrical changeover means being electrically connected with each other upon attainment of the voltage of said main capacitor to said critical anode-to-cathode voltage to render operative said mechanical timing device.

30. A photographic camera adapted for use in flash photography with a flash unit associated therewith, said flash unit having a flash-tube which is discharged with supply of once stored electrical energy to produce flash illumination, said camera comprising:
   A. a housing
   B. shutter means incorporated in said housing for unblocking and blocking an exposure aperture to establish an exposure interval;
   C. shutter adjusting means operatively connected to said shutter means for adjusting said shutter means to one of at least two possible settings of different exposure interval, said adjusting means including:
      a. electronic timing means provided with a time constant circuit and an electronic switching circuit receptive of the output of said time constant circuit and responsive to attainment of a threshold level for actuating electromagnetic means operatively connected with said shutter means to control the period of actuation of said shutter means, wherein said time constant circuit has:
         1. photocell means for forming an electrical signal with a magnitude proportional to the object brightness level,
         2. a light metering circuit containing said photocell means and responsive to photographic information representing exposure control parameters other than the object brightness and shutter speed for deriving an output signal representing an exposure value,
         3. first resistance means of which the resistance value is adjusted in accordance with the magnitude of the output signal from said light metering circuit,
         4. second resistance means having a resistance value corresponding to the flash exposure interval, and
         5. capacitance means; and wherein said electronic changeover means has:
            i. a first switching element connected between said first resistance means and said capacitance means; and
            ii. a second switching element connected between said second resistance means and capacitance means, said first and second switching elements being controllable so as to select either of said first and second resistance means for connection to said capacitance means;
      b. at least one electronic changeover switch associated with said time constant circuit upon actuation to set said time constant circuit to selected two of different time constants, one of the selected time constants corresponding to the exposure interval suited for flash photography and the other time constant corresponding to the exposure interval not suited for flash photography;
D. electrical level detecting means receptive of an electrical input signal and responsive to attainment of a threshold level higher than the critical voltage for the discharging of said flash-tube for producing a control output signal which is directed to said changeover switch;
E. electrical terminal means fixedly mounted on said housing and extending therefrom for an electrical connection with the circuit of said flash unit, said terminal means being connected to said detecting means; and
F. said detecting means being electrically connected to said electronic changeover means, whereby when the critical voltage for said flash-tube is established, said shutter means is automatically adjusted to said flash exposure interval setting.

31. An exposure control system for a photographic apparatus comprising:
A. an electronic flash device;
B. electrical energy storing means for flash illumination;
C. means for causing the electrical energy of said storing means to be discharged through said flash device, thereby a photographic subject is illuminated with flash light from said flash device;
D. detecting means connected to said storing means for detecting the attainment of a predetermined voltage developed by the stored charge of said storing means as the critical level for assuring the firing of said flash device;
E. shutter means for unblocking and blocking an exposure aperture to establish an exposure interval;
F. shutter adjusting means operatively connected to said shutter means for adjusting said shutter means to one of at least two settings of different exposure interval, said possible settings providing corresponding exposure intervals including one suited for taking photographs with flash illumination from said firing flash device and one not suited for making an exposure in flash mode but for use in daylight photography; and
G. changeover means receptive of the output of said detecting means and associated with said shutter adjusting means for selectively switching said adjusting means to an operative condition providing said flash exposure interval automatically in response to attainment of the voltage of said storing means to said critical voltage level of said flash device, whereby said shutter means is adjusted to the setting providing said flash exposure interval, said changeover means having memory means connected to the output of said detecting means for memorizing an output signal thereof to maintain the switched condition of said changeover means even after said electrical energy storing means is discharged.

32. An exposure control system according to claim 31, wherein said memory means is a condenser.

* * * * *